United States Patent
Vogel

(10) Patent No.: US 9,115,700 B2
(45) Date of Patent: Aug. 25, 2015

(54) FOUNDATION FOR WIND TURBINE

(71) Applicant: Wobben Properties GmbH, Aurich (DE)

(72) Inventor: Markus Vogel, Oldenburg (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 14/309,784

(22) Filed: Jun. 19, 2014

(65) Prior Publication Data

US 2014/0298750 A1 Oct. 9, 2014

Related U.S. Application Data

(63) Continuation-in-part of application No. PCT/EP2012/073888, filed on Nov. 29, 2012.

(30) Foreign Application Priority Data

Dec. 22, 2011 (DE) .......................... 10 2011 089 522

(51) Int. Cl.
*E04B 1/00* (2006.01)
*F03D 11/04* (2006.01)
*E02D 27/42* (2006.01)
*E02D 37/00* (2006.01)
*E02D 27/00* (2006.01)

(52) U.S. Cl.
CPC .............. *F03D 11/045* (2013.01); *E02D 27/00* (2013.01); *E02D 27/42* (2013.01); *E02D 37/00* (2013.01)

(58) Field of Classification Search
CPC ................................ E02D 27/42; E02D 37/00
USPC ................. 52/741.1, 1, 296, 297; 405/239
See application file for complete search history.

(56) References Cited

U.S. PATENT DOCUMENTS

| | | | | |
|---|---|---|---|---|
| 3,115,013 | A * | 12/1963 | Thornley | 405/225 |
| 3,579,929 | A * | 5/1971 | Holthenrichs et al. | 52/1 |
| 4,561,231 | A * | 12/1985 | Hoyt et al. | 52/297 |
| 5,348,124 | A * | 9/1994 | Harper | 188/378 |
| 5,826,387 | A * | 10/1998 | Henderson et al. | 52/295 |
| 6,672,023 | B2 * | 1/2004 | Henderson | 52/296 |
| 8,352,213 | B2 | 1/2013 | Chang et al. | |
| 2004/0131428 | A1 * | 7/2004 | Henderson | 405/233 |
| 2006/0248954 | A1 * | 11/2006 | Snieder | 73/570 |
| 2007/0006541 | A1 | 1/2007 | Seidel | |
| 2007/0269272 | A1 | 11/2007 | Kothnur et al. | |
| 2007/0269273 | A1 * | 11/2007 | Henderson | 405/239 |

FOREIGN PATENT DOCUMENTS

| | | |
|---|---|---|
| CN | 1788156 A | 6/2006 |
| CN | 101109359 A | 1/2008 |
| DE | 37 33 537 A1 | 4/1989 |
| DE | 10 2008 032 184 A1 | 1/2010 |
| DE | 20 2010 007 750 U1 | 8/2010 |
| DE | 10 2009 022 540 A1 | 12/2010 |
| EP | 2 395 155 A1 | 12/2011 |
| TW | I317772 B | 12/2009 |
| TW | 201137202 A1 | 11/2011 |
| WO | 2010/084210 A1 | 7/2010 |

* cited by examiner

*Primary Examiner* — Basil Katcheves

(74) *Attorney, Agent, or Firm* — Seed IP Law Group PLLC

(57) ABSTRACT

A method of stabilizing a wind power installation including early identification of the need for stabilization of the wind power installation by means of measurement of the pylon movement during operation of the wind power installation.

17 Claims, 3 Drawing Sheets

FOUNDATION FOR WIND TURBINE

BACKGROUND

1. Technical Field

The present invention concerns a method of stabilizing a wind power installation. One or more embodiments of invention concern in particular a method of stabilizing the connection of a foundation section of the wind power installation to the foundation of the wind power installation.

2. Description of the Related Art

The German Patent and Trade Mark Office found the following publications in relation to the application claiming priority for this application: WO 2010/084 210 A1, DE 37 33 537 A1 and DE 10 2008 032 184 A1.

DE 20 1010 007 750 U1 discloses a strengthened foundation in which a strengthening layer of concrete is applied to the foundation, wherein there is at least one bore introduced into the foundation and extending through the strengthening layer, wherein provided in the bore is an anchor passing through the strengthening layer and projecting into the foundation, wherein the bore space remaining in the bore is filled with a hardened casting material or is substantially filled therewith and wherein the anchor is biased by means of at least one biasing element on the anchor head.

DE 37 33 537 A1 discloses a method of restoring concrete foundations on masts and the like, in which fracture zone which are formed within the foundations in the area around steel profile members serving to hold mast stems and in which water accumulates even when the top side of the foundation is covered in completely water-tight fashion is filled with plastic with displacement of the water, the plastic being injected through bores produced in the foundation.

Methods of the above-indicated kind are used in wind power installations. The need for such stabilization methods arises from the fact that the wind power installations are exposed to dynamic loadings because of changing wind directions and wind strengths. The pylons of wind power installations are typically let into a concrete foundation with a lower region which can be in the form of a foundation section. In that case the foundation section frequently comprises steel or high-strength material around which the foundation concrete hardens. That provides a force-locking connection. By virtue of the dynamic stressing of the wind power installation, possibly increased by defective installation or inadequate hardening of the foundation material, with an increasing service life of the wind power installations, the foundation material surrounding the foundation section becomes loosened and as a result movement play and cracking occurs. Ultimately the structural stability is adversely affected thereby, with the force-locking connection between the foundation section and the foundation becoming weaker. To be able to guarantee further operation of the wind power installation stabilization of the wind power installation is necessary, that is to say restoring an adequate force-locking connection between foundation section and foundation.

Methods are known which permit stabilization of the foundation of the wind power installation without the wind power installation having to be completely dismantled above the foundation. Such a method is known from DE 10 2009 022 540.4. In its essential features the method disclosed there is based on lifting the entire wind power installation by one or more lifting means, for example hydraulic presses, into the upper end position involving the movement play, of a hollow space which is formed around an anchor segment of the wind power installation. After the wind power installation has been lifted and fixed in that upper position, the hollow space beneath the anchor segment which is in the upper end position of the movement play is filled in an injection process and the lifting means are removed after the filling material has hardened.

While the above-described methods afford an improvement in the maintenance-friendliness in relation to completely shutting down operation of the wind power installation and dismantling it, there is nonetheless a considerable potential for improvement in regard to maintenance time and costs which in known installations are in the region of several tens of thousands Euros or even markedly more. Accordingly the object of the invention is to provide a method of the kind set forth in the opening part of this specification, which while involving lower costs permits stabilization of a wind power installation and at the same time minimizes the outage time of the wind power installation.

BRIEF SUMMARY

One or more embodiments of the invention involve performing early identification of the need for stabilization of the wind power installation by means of measurement of the pylon movement during operation of the wind power installation. In one embodiment, the method includes performing a stabilization measure, including pre-preparation of at least a portion of the surface of a foundation of the wind power installation for the application of boring means, introducing a plurality of bores by means of the boring means in the pre-prepared surface to a predetermined depth, preferably to an anchor segment of the foundation section, introducing a hardenable material into the plurality of bores, hardening the introduced hardenable material in the bores, and post-preparation of the at least one portion of the surface of the installation foundation.

One or more embodiments of invention makes use of the realization that the methods of the known kind come into operation at a moment in time when the damage to the installation foundation is already so advanced that stabilization by means of lifting the installation is unavoidable. There are many different reasons for late recognition of the need for stabilization and those reasons usually involve the manner of filling the upper region of the installation foundation so that damage and cracking cannot be detected at all or can be detected only late. One embodiment of the invention involves measurements of the pylon movement during operation of the wind power installation for early identification purposes. Preferably in that respect early identification includes measurement of a vertical pylon movement relative to the foundation of the wind power installation by means of one of more length change sensors (travel detectors) which are positioned at or fitted to the windward side and/or the leeward side of the pylon. The pylon movement, in particular the vertical pylon movement, is an important indicator for the presence of movement play between the foundation section of the wind power installation and the installation foundation. Such a vertical pylon movement also already occurs when no cracks are yet visible from the exterior, or possibly existing cracks are concealed by other elements. In that way it is possible to determine a need for stabilization of the wind power installation, which however is of such an extent that complicated and expensive fixing of a wind power installation by using lifting means is avoided. That therefore considerably reduces both the time needed for stabilization of the wind power installation and also the costs involved as the provision of the lifting means is no longer required. In contrast implementation of the early identification operation can be achieved at low cost and involving little time.

Advantageous embodiments will be apparent in particular from the appendant claims and the description hereinafter.

The one or more length change sensors are optionally mounted each time for performing the early identification operation and are connected to the pylon and the foundation or alternatively are fitted only once and are thus disposed permanently at their measurement location.

In accordance with an advantageous development of one embodiment of the invention early identification includes deactivating the wind power installation, calibrating the length change sensor or sensors, activating the wind power installation, starting measurement of the pylon movement, and storing the measured pylon movement as soon as the fluctuation in values outputted by the length change sensor or sensors falls below a predetermined value, preferably falls below a value of 1 mm, and particularly preferably assumes the value of zero.

Early identification further preferably includes establishing the lack of need for a stabilization measure if the stored pylon movement assumes an amount of 3 mm or less, preferably 1 mm or less. In the event of such a detected pylon movement it is assumed that the force-locking connection between the foundation and the foundation section has admittedly already been adversely affected, but overall the stability of the wind power installation is still sufficient to be able to continue operation without further support measures.

Preferably the method includes the steps: compensating for the measured pylon movement by means of subtraction of the elasticity-induced deflection of the length change sensors (or the length change sensor), and storing the compensated pylon movement. The magnitude of that elasticity-induced deflection which is expressed in stretching of the pylon wall depends on the respective type of installation being investigated and in particular also on the pylon diameter, wall thickness and depth of engagement of the foundation in the foundation, this meaning that depth to which the pylon is anchored in the foundation.

Further preferably measurement of the pylon movement is effected by means of one or more dial gauges which are preferably mounted by means of a magnetic support to the pylon wall of the wind power installation, particularly preferably at the outside wall of the installation or are brought into contact therewith from the foundation. That is preferred because measuring people then do not have to be exposed to the safety risks arising in the interior of the pylon. Alternatively, fitment in the inside region of the wind power installation is preferred if measurement can be implemented without the presence of people, for example in the case of previously permanently fitted measurement means, and by means of remote operation. In that case early identification can be performed with the reduced influence of external disturbances.

In a further preferred embodiment of the method it includes the steps: measuring the wind speed driving the wind power installation, and performing early identification if the wind speed is 7.5 m/s or more, preferably 10 m/s or more. It has been found that the reliability of the measurement results and in particular the information given on the basis of the pylon movement is surprisingly good at wind speeds of 7.5 m/s or more, preferably 10 m/s or more.

Further preferably the method includes monitoring the pod position of the wind power installation during measurement of the pylon movement, discontinuing the pylon movement measuring operation if a change in the pod position is detected, preferably in a range of 5° or more, re-positioning the length change sensor or sensors at the changed windward side and/or the changed leeward side of the pylon in dependence on the change in the pod position, and re-starting the pylon movement measurement. To maximize as much as possible the information afforded by measurement of the vertical pylon movement, care is taken to ensure in this embodiment that the conditions during the measurement procedure remain constant for the length change sensors which are fixedly connected to the pylon and the foundation. If the pod position changes, if therefore the wind comes from another side, another section of the pylon wall—namely that at the new windward or leeward side—will move more greatly than that at which the sensor was previously mounted. Modern wind power installations have sensor systems for determining the wind direction and control systems for adapting the pod position to variable wind directions. Preferably positioning of the length change sensor or sensors is implemented by communication with the control system or an optical display of pod position and/or wind direction, and adapted thereto.

Preferably the step of measuring the pylon movement is performed three times and includes the step of forming an average value of the three measurements made of the pylon movement. Although measurement can also be effected more often than three times, it has nonetheless been found that the three repeated measurements provide a high level of information in a reasonable overall time.

A preferable development of the method provides that the pre-preparation step includes pre-preparation of an outer portion and an inner portion of the surface of the installation foundation, and/or exposing the foundation material, for example by means of removal of a sealing or cover layer, and/or covering a region of the pylon wall, that is arranged adjoining the foundation, by means of a protective film.

In a method of the kind set forth in the opening part of this specification in accordance with a second aspect the invention attains the object thereof in that the step of introducing the plurality of bores includes introducing from 10 to 40 bores, preferably 20 bores, along the periphery of a circle outside the pylon of the wind power installation, and introducing from 10 to 40 bores, preferably 20 bores, along the periphery of a circle within the pylon of the wind power installation.

The features and embodiments in the second aspect of the invention are at the same time advantageous developments of the invention in accordance with the first aspect (described hereinbefore) and a third aspect (described hereinafter). It has surprisingly been found that the number of bores introduced downwardly from the foundation surface for performing the injection method have a decisive influence on the quality of stabilization. If the spacing between the adjacent injection bores is too great, then potentially foundation damage, cracks or gaps extending horizontally between the bores are not reached by the injection bores and are later not filled or are only inadequately filled with filling material. If the spacing between adjacent injection bores is selected to be too small, then an excessive amount of work and time has to be involved for placing the bores. Depending therefore on the installation diameter, an arrangement of the above-mentioned number of bores is particularly preferred. It has also proven to be particularly advantageous to bore down into the foundation both from outside the pylon and also from within the pylon, because that provides for homogenous distribution of the injection inlets and at the same time both the foundation damage, gaps or cracks extending inside and also those extending outside—with respect to the cross-section of the foundation—can be discovered for filling with injection material.

Preferably the method includes the steps:
- endoscope inspection of each bore introduced into the foundation,
- establishing whether the bore extends to an anchor segment of the wind power installation, and
- establishing whether the bore is free of contaminations, in particular in the form of water and/or particles.

A further advantageous development of the method provides that it includes one, more or all of the steps:
- cleaning the bore by means of flushing and/or blowing it out when contaminations have been detected,
- increasing the bore depth if the bore does not yet extend to the anchor segment of the wind power installation, and/or
- repeating the endoscope inspection step.

In that respect the endoscopy process assumes a dual function which on the one hand permits evaluation as to whether the anchor segment of the wind power installation is reached by the injection bores. On the other hand it permits an assessment as to whether the injection bores and discovered cavities are sufficiently free of moisture and dirt to be able to introduce the injection material without endangering hardening and reliable achievement of the force-locking connection in the further course of the procedure.

In accordance with a third aspect of the invention the invention attains the object thereof in that a low-viscosity epoxy resin is introduced as the hardenable material into the plurality of bores, preferably an epoxy resin which is resistant to high pressure and/or which has a high level of tensile strength and/or which is moisture-resistant. The features and embodiments in accordance with the third aspect of the invention are at the same time advantageous developments of the invention according to the first and second aspects (described hereinbefore) of the invention.

In the present case a low-viscosity characteristic is used to mean the occurrence of a mix viscosity of 400 mPas, preferably 350 mPas and less, particularly preferably in the region of 100 mPas and less.

In the present case mix viscosity means the viscosity of the epoxy resin in the mixed, non-hardened condition at a temperature of preferably 18-25° C.

In the present case a high pressure-resistant characteristic means the occurrence of a resistance to pressure in the hardened condition, preferably after 7 days, at at least 420 C., in a region of 35 $N/mm^2$ or more, preferably in a region of 45 $N/mm^2$ or more, particularly preferably in a region of 70 $N/mm^2$ or more. The resistance to pressure can be determined for example in accordance with DIN EN 196 T1 or ASTM D-695.

In the present case high tensile strength is used to mean the tensile strength in the hardened condition, preferably after 7 days, of 35 $N/mm^2$ or more, particularly preferably in a region of 45 $N/mm^2$ or more. Tensile strength is determined for example in accordance with DIN 53455 or ASTM D-638.

In the present case the moisture-resistant characteristic means the property of withstanding water absorption. Preferably water absorption after 7 days, over a 24 hour period, with constant water contact, is an absorption of 2% or less, preferably 0.3% or less. Water absorption is determined for example in accordance with ASTM D-570. Monitoring the absorption characteristic is primarily relevant for an observation period during hardening. As soon as the epoxy resin has hardened the material can be assumed to be water-tight.

The epoxy resin may be mixed from two or more components.

Preferably in the method according to at least one embodiment the invention post-preparation of the at least one portion of the surface of the installation foundation includes re-profiling the surface of the foundation by means of filling in the exposed regions of the foundation with a plastic-modified, cement-bound mortar. Such a mortar is also known as PCC mortar (Polymer Cement Concrete). The particular advantage of such a PCC mortar is that it hardens even under a dynamic alternating loading without losing its function. Preferably the plastic-modified cement-bound mortar has a resistance to pressure of 45 $N/mm^2$ or more, determined for example in accordance with EN 12190 and/or a modulus of elasticity in the region of 20 $kN/mm^2$ (Gpa) or more, determined for example in accordance with EN 13412. Such mortars can be selected from Class R4 in accordance with DIN EN 1504-3 or from stressability Class M3 in accordance with "DafStb-Richtlinie Schutz and Instandsetzung" (German Committee for Structural Concrete Guideline Protection and Maintenance).

BRIEF DESCRIPTION OF THE SEVERAL VIEWS OF THE DRAWINGS

The invention is described in greater detail hereinafter by means of a preferred embodiment by way of example having regard to various aspects of the invention and with reference to the accompanying Figures in which.

DETAILED DESCRIPTION

The method is started in step 1. Then the wind power installation is firstly deactivated as step 3. In step 5 the one or more length change sensors is optionally mounted to the pylon wall of the wind power installation or to the foundation and at least some of them are connected to together, such as in series. The length change sensor or sensors are also calibrated in step 5. The wind speed is determined in step 7. Optionally (not shown) the wind speed is determined when the wind power installation is still activated and the wind power installation is deactivated in accordance with step 3 only if a wind speed of greater than or equal to 7.5 m/s, preferably greater than or equal to 10 m/s, is measured in step 9. If a speed of less than 7.5 m/s or preferably less than 10 m/s is found, determination of the wind speed is continued at step 7.

If the wind speed is sufficiently high and the wind power installation is deactivated, starting of the wind power installation and measurement of the vertical pylon movement by the length change sensors is effected in step 11. At the same time or substantially at the same time monitoring or measurement of the change in the pod position starts in a step 15. In the step shown next, the system monitors whether a change in angle or a change in position of the pod occurs. If that is the case, the measurement is discontinued and steps 5 to 11 are repeated for the new pod position. For that purpose the mounted length change sensors possibly have to be removed and re-fitted at the new windward or leeward side. Optionally a guide mechanism is provided for that purpose, for easily pivoting and re-positioning the sensors.

For the situation where, during the entire period of the measurement procedure, a substantially constant angle of the pod or a constant pod position is to be detected in step 13, measurement is regularly terminated in step 17. Step 19 involves compensation calculation of the actual vertical pylon movement by means of subtraction of the predetermined elasticity-induced vertical movement components which are typical of the installation.

In step 21 the (optionally) compensated measurement result from steps 11 to 19 is stored, preferably by being stored in an electronic data carrier.

If the result stored in step 21 represents a vertical pylon movement of greater than or equal to 3 mm, particularly preferably greater than or equal to 1 mm, then implementation of the stabilization measure in accordance with step 101 is initiated (see hereinafter FIG. 2). If the value stored in step 21 represents a vertical pylon movement of less than 3 mm, preferably less than 1 mm, step 25 involves issuing the communication that there is no need for stabilization and the method is concluded in step 27.

Figure 1:
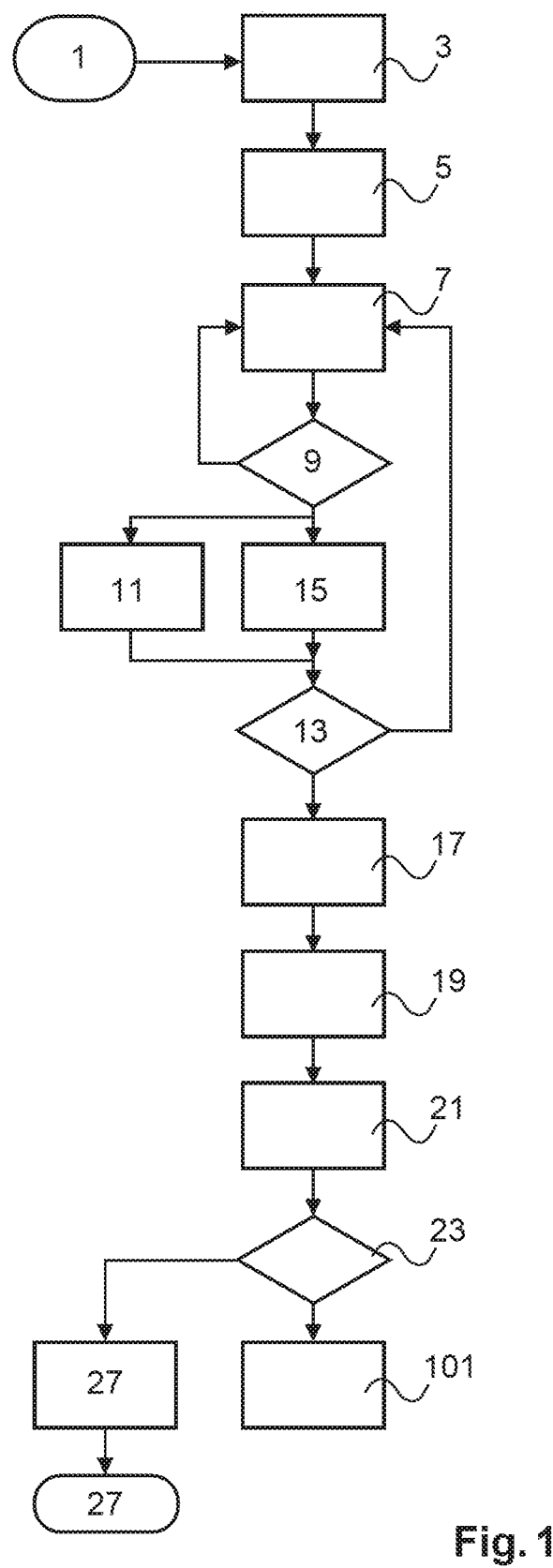
FIG. 1 shows a first part of a flow chart of the method according to one embodiment of the invention.
Figure 2:
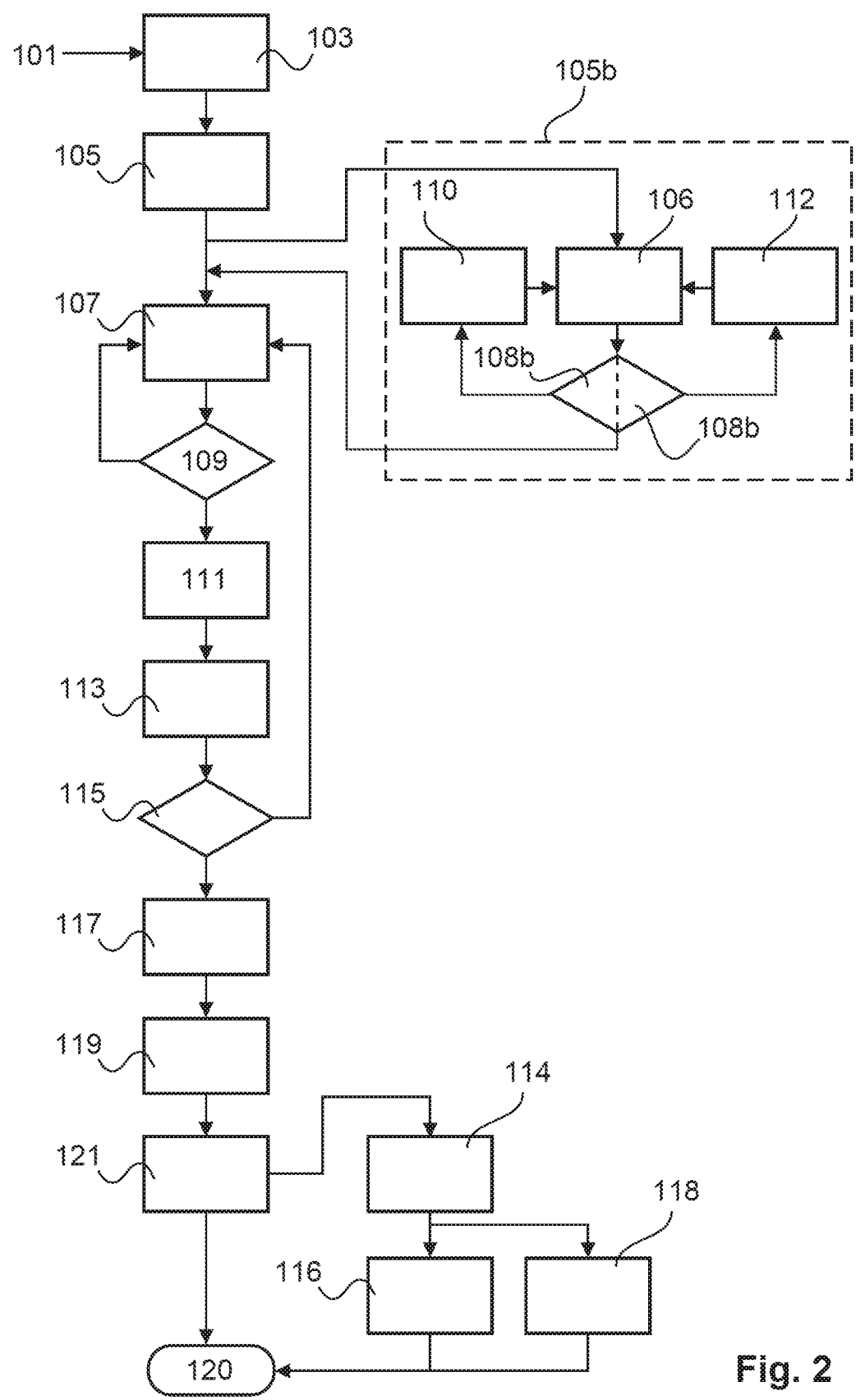
FIG. 2 shows a second part of a flow chart of the method according to one embodiment of the invention.

The stabilization method is diagrammatically shown in FIG. 2. Firstly stabilization is started in step 101. Step 103 shows the pre-preparation at least of a portion of the surface of a foundation of the wind power installation for the placement of boring means, such as concrete drills. In step 105 a plurality of bores are introduced by means of the boring means into the pre-prepared surface, down to a predetermined depth, preferably to an anchor segment of the foundation section of the wind power installation. At the latest at the beginning of step 105 the wind power installation should be deactivated. Optionally, an endoscopy process follows the operation of producing the plurality of bores in accordance of steps 106, 108, 110 and 112. The endoscope inspection step, indicated by the broken line as step 105b, includes at step 106 an endoscope inspection of each bore introduced into the foundation, preferably by inserting an optical endoscope. In that case the endoscope performs a dual function; if step 108a establishes that the predetermined boring depth and in particular the anchor segment of the foundation section of the wind power installation has not yet been reached, step 110 involves again using the boring means to increase the boring depth, for example at predetermined intervals.

An endoscope inspection is then carried out again in accordance with step 106. If step 108b establishes that the bore produced is not yet sufficiently freed of water and/or contaminations then in step 112 renewed cleaning of the bore is effected by flushing it out and/or blowing it out. The endoscopy process in step 106 is then repeated. Steps 108, 108b can be effected simultaneously, while steps 110 and 112 are preferably effected in succession.

After the bores are made in the foundation and optionally after performance of the endoscopy process in accordance with step 105b injection material is filled into the bores in accordance with step 107. Initiation is preferably effected by means of injection packers. Preferably a low-viscosity epoxy resin which is resistant to high pressure and which has high tensile strength is used as the injection material. For that purpose for example the materials MC DUR 1264 FF from MC-Bauchemie are available to the man skilled in the art, or SIKADUR® 35 HI-MOD-LV from Sika Construction, and alternatively WEBAC® 4170 from WEBAC Chemie. It is also readily possible for the man skilled in the art to select a suitable epoxy resin on the basis of the above-described criteria and optionally by performing preliminary tests, and to prepare it in accordance with the respectively applicable manufacturing instructions. Taking account of the respectively prescribed mixing ratios, temperatures and rotational speeds, such an epoxy resin is produced from two or more components by stirring and injected by means of the injection packers.

In step 109 the procedure establishes whether injection material issues or expels from one of the other bores made or from an exposed gap. If that is not the case step 107 is continued or repeated. If injection material issues, step 111 involves recording a) where the injection material was introduced, and b) where the injection material issues. Then in step 113 the injection of the injection material is continued with the next, that is to say preferably adjacent injection hole. Optionally the method is performed for each borehole made similarly to steps 107, 109 and 111. In that way a record is made as to how the introduced material spreads beneath the surface of the foundation, which allows conclusions to be drawn about on the one hand the amount of injection material filled and on the other hand of the path of propagation of the injection material.

If it is detected in step 115 that injection material was introduced into all the bores made, a check is made in step 117 to see whether all bores are completely filled or whether post-pressing of the material is necessary. If material post-pressing is necessary steps 107 to 117 are repeated. That ensures that the material is completely pressed in.

Hardening of the injection material is effected in step 119. Step 121 includes post-working or post-preparation of the at least one portion of the surface of the installation foundation, in particular of that which was exposed to make the bores. This includes preferably in step 114 the operation of re-profiling the surface of the foundation by means of filling of the exposed regions of the foundation with a plastic-modified, cement-bound mortar and optionally further materials, for example an adhesive bridge. Then hardening of the mortar or filled-in material is effected in step 116 and activation of the wind power installation is effected in step 118. By virtue of the plastic-modified, cement-bound mortar proposed according to the invention, both of those can be performed at the same time because the mortar permits functionally correct hardening even under a dynamic loading. Finally the end of the method occurs in step 120.

Figure 3:
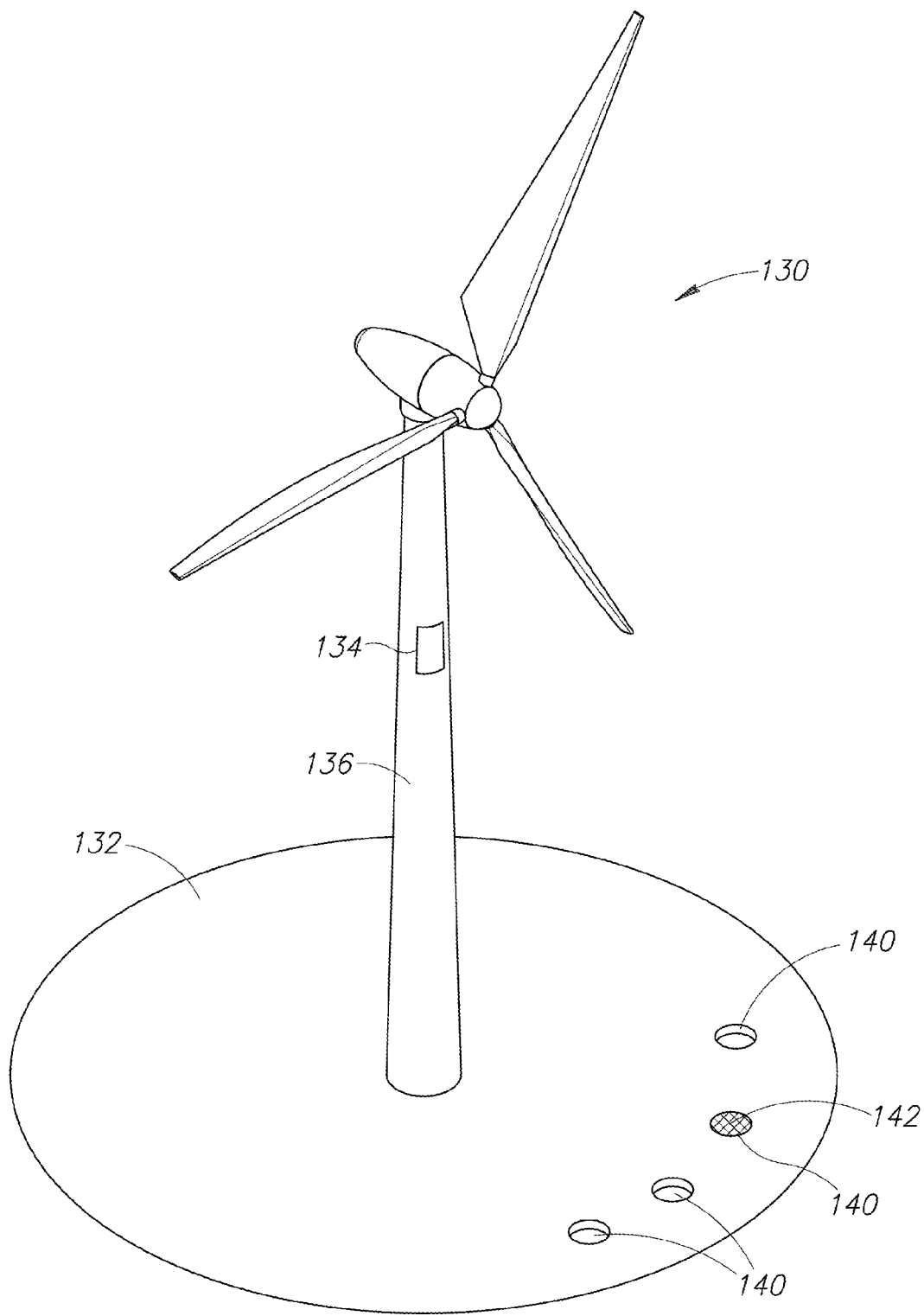
FIG. 3 shows a schematic illustration of a wind power installation and foundation according to one embodiment of the invention.

FIG. 3 illustrates a wind power installation 130 and foundation 132 in accordance with the methods described above. Length change sensors 134 are attached to the pylon 136 of the wind power installation 130. Although the length change sensors 134 are shown on an outer surface of the pylon 136, it is to be appreciated that the sensors 134 may be located in the interior of the pylon 136. The foundation includes a plurality of bores 140 formed in the foundation. The size of the bores 140 are not drawn to scale but are exaggerated for illustrative purposes. One of the bores 140 is filled with an injection material 142.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
   determining whether a wind power installation needs to be stabilized relative to a foundation, wherein determining comprises:
      measuring a vertical pylon movement relative to the foundation of the wind power installation using one or more length change sensors positioned on at least one of a windward side and a leeward side of a pylon of the wind power installation;
      deactivating the wind power installation;
      calibrating the one or more length change sensors;
      activating the wind power installation;
      measuring pylon movement; and
      storing the measured pylon movement as soon as the fluctuation in values outputted by the one or more length change sensors falls below a predetermined value;
   monitoring a position of a pod of the wind power installation pylon when movement is being measured;
   discontinuing measuring the pylon movement when a change in the pod position is detected that is greater than 5°;
   re-positioning the one or more length change sensors to a re-positioned windward side or leeward side of the pylon in in view of the change in the pod position;
   re-starting the pylon movement measurement;
   pre-preparation of at least a portion of a surface of the foundation of the wind power installation;
   forming a plurality of bores in the pre-prepared surface to a predetermined depth;
   introducing a hardenable material into the plurality of bores; and
   hardening the introduced hardenable material in the bores.

2. The method according to claim 1 wherein determining includes establishing a lack of need for a stabilization if the stored pylon movement is less than 3 mm.

3. The method according to claim 1 further comprising:
   compensating for the measured pylon movement by subtraction of an elasticity-induced deflection of the one or more length change sensors, and
   storing the compensated pylon movement.

4. The method according to claim 1 wherein measurement of the pylon movement is effected by one or more dial gauges that are mounted to a wall of the pylon of the wind power installation.

5. The method according to claim 1 further comprising measuring the wind speed driving the wind power installation, and wherein the determining step is performed if the wind speed is greater than 7.5 m/s.

6. The method according to claim 1 wherein the step of measuring the pylon movement is performed three times and includes forming an average value of the three pylon movement measurements made.

7. The method according to claim 1 wherein the pre-preparation step includes at least one of the following:
   pre-preparation of an outer portion and an inner portion of the surface of the installation foundation;
   exposing the foundation material by removing a sealing or cover layer; and
   covering a region of the pylon wall that is arranged adjoining the foundation by a protective film.

8. The method according to claim 1, wherein forming the plurality of bores includes forming between 10 to 40 bores along a periphery of a circle outside the pylon of the wind power installation, and forming between 10 to 30 bores along a periphery of a circle within the pylon of the wind power installation.

9. The method according to claim 1 further comprising:
   performing an endoscope inspection of each bore formed in the foundation;
   determining whether the bore extends to an anchor segment of the wind power installation; and
   determining whether the bore is free of contaminations.

10. The method according to claim 9 further comprising at least one of the following steps:
    cleaning the bore by flushing and blowing out contaminations;
    increasing a depth of one of the bores when the bore does not extend to the anchor segment of the wind power installation; and
    repeating the endoscope inspection step.

11. The method according to claim 9 wherein the contaminants include water and particles.

12. The method according to claim 1, wherein a low-viscosity epoxy resin is the hardenable material that is introduced into the plurality of bores.

13. The method according to claim 12 wherein the epoxy resin is mixed from two or more components and wherein the epoxy resin is moisture-resistant.

14. The method according to claim 1 further comprising post-preparation of the at least one portion of the surface of the installation foundation, and wherein post-preparation includes re-profiling the surface of the foundation by filling in the exposed regions of the foundation with a plastic-modified, cement-bound mortar.

15. The method according to claim 1 wherein a depth of the plurality of bores is to an anchor segment of the foundation section.

16. The method according to claim 1 wherein the predetermined value is 1 mm.

17. The method according to claim 1 wherein forming the plurality of bores in the pre-prepared surface to the predetermined depth comprises wherein forming the plurality of bores in the pre-prepared surface to a depth that is at least as deep as a portion of an anchor segment of the foundation section.

* * * * *